Jan. 17, 1967  G. R. ROSENDAHL  3,298,770
OPTICAL INSTRUMENT WITH ADJUSTABLE ERECTING MIRROR SYSTEM
Filed March 16, 1962  2 Sheets-Sheet 1

INVENTOR.
GOTTFRIED R. ROSENDAHL
BY
ATTORNEY

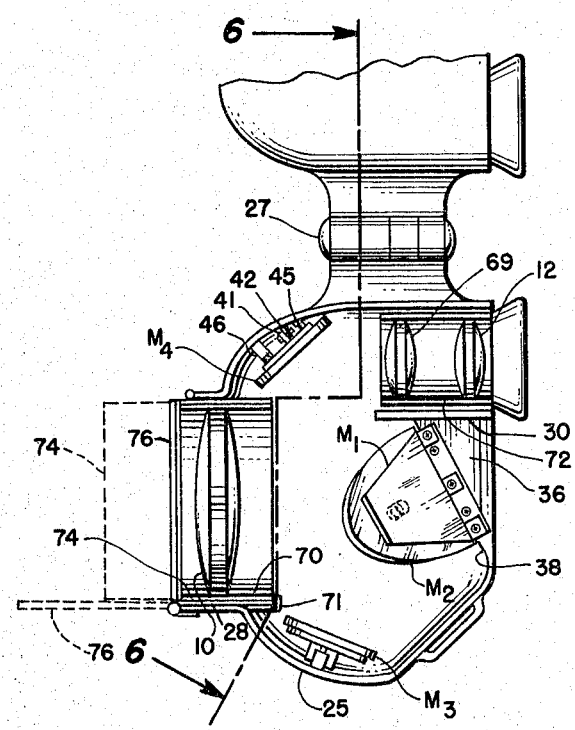
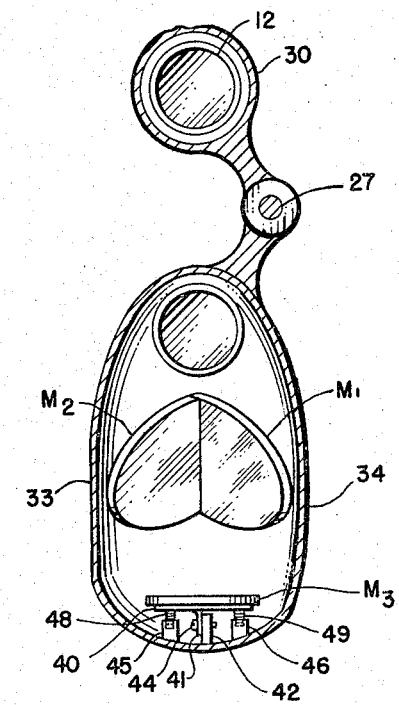
FIG. 5    FIG. 6
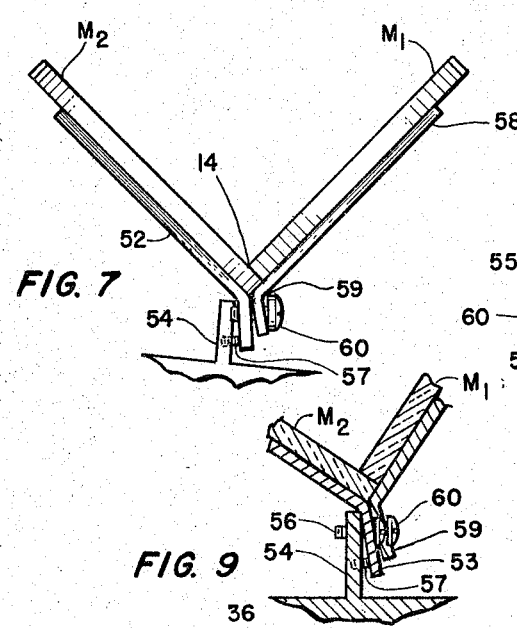
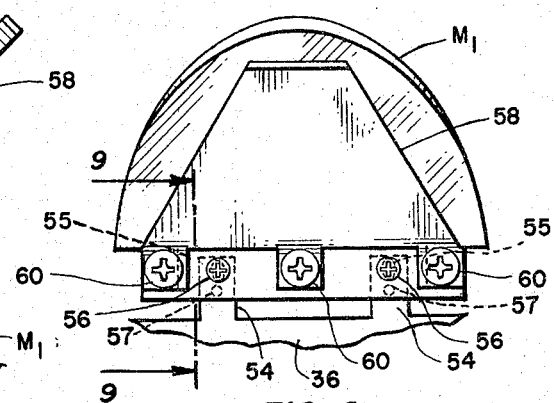
FIG. 7   FIG. 8
FIG. 9
INVENTOR.
GOTTFRIED R. ROSENDAHL
BY John E. Reilly
ATTORNEY United States Patent Office 3,298,770
Patented Jan. 17, 1967

3,298,770
OPTICAL INSTRUMENT WITH ADJUSTABLE
ERECTING MIRROR SYSTEM
Gottfried R. Rosendahl, Philadelphia, Pa., assignor, by mesne assignments, to International Telephone and Telegraph Corporation
Filed Mar. 16, 1962, Ser. No. 180,154
3 Claims. (Cl. 350—36)

This invention relates to a new and useful optical erecting mirror system and instrument, and more particularly relates to an optical system employing plane mirrors only which is capable of complete image erection and is adapted for use in various instrumentation and equipment, such as, field glasses and binoculars.

It is known broadly to accomplish complete image erection using reflecting surfaces, either in the form of plane mirrors, prisms, or a combination thereof. Prisms, however, present a number of disadvantages including the fact that they are relatively heavy and bulky and require quite accurate and expensive, bulky means of support. Moreover, in manufacturing prisms it is necessary to grind a greater number of surfaces than are actually necessary for reflection of the image, and special jigs must be employed to maintain the required angle accuracy within the prism, because the two reflecting surfaces of a prism cannot be adjusted with respect to each other.

The use of plane mirrors is advantageous in many respects, including the fact that they are obviously easier to manufacture, and are more compact and lightweight. In using plane mirrors, specifically for the purpose of bringing about complete erection of an image, a pair of plane mirrors in the form of a "roof" is desirably employed since it secures the advantage of permitting a larger variety of ways to fold up the light path between the objective lens and the ocular and thereby will require a relatively small area or space. This would have the advantage particularly in conjunction with the design and construction of field glasses where with small volume requirements the glasses would be much lighter and easier carried.

In the past, however, roof-mirror pairs have been considered to be somewhat impractical in use, having a tendency to produce a shadow in the image field, double images and distortion, unless highly critical tolerance requirements are met in manufacture and assembly. It is therefore a principal object of the present invention to make provision for a novel and improved optical erecting system using plane mirror reflecting surfaces only and incorporating a roof-mirror pair in such a way as to overcome the above and other disadvantages of prior art erecting system while securing a number of added advantages and features in a new and unexpected way.

It is another object of the present invention to provide for a simplified, plane mirror optical erecting system for use in association with various equipment and instrumentation, and which system incorporates a roof-mirror pair so constructed and arranged as to provide for complete image erection with minimum distortion and while avoiding critical tolerance requirements; moreover, wherein the entire optical erecting system has its optical axis in a single plane and in such a way that comparatively long light paths can be folded into an extremely small volume while obviating the use of relatively expensive objectives and oculars of small focal length.

It is a further object to provide, for use in association with an objective lens and ocular, an optical erecting system comprising solely plane mirrors which are independently adjustable, and in such a way as to eliminate special adjusting means for the objective lens and ocular; and, where more specifically the roof-mirror pair is arranged and made adjustable in relation to the entire system so as to avoid critical tolerance requirements while eliminating any distorting effects on the image, such as shadows, double images, or falling lines.

It is a further object to make provision for an optical instrument adapted for use in field glasses and binoculars whereby perception is greatly enhanced specifically by spacing the objective lenses relatively far apart in relation to the eyepiece without compromising volume and weight requirements and with additional provision being made in the instrument to protect against stray light.

It is a still further object of the present invention to make provision for an optical instrument having excellent magnification, minimum distortion and a wide latitude of adjustment while being very compact and lightweight.

The above and other objects, advantages and features of the present invention will become more readily understood and appreciated from a consideration of the following detailed description taken together with the accompanying drawings, in which:

FIGURE 5 is a fragmentary, enlarged view, partially in section, of the binocular arrangement shown in FIGURES 3 and 4;

FIGURE 6 is a view taken on line 6—6 of FIGURE 5;

FIGURE 7 is a detailed, enlarged side view showing the mounting and adjusting arrangement for the roof-mirror pair; and FIGURE 8 is a top plan view of the arrangement shown in FIGURE 7; and FIGURE 9 is a view taken about line 9—9 of FIGURE 8.

Figure 1:
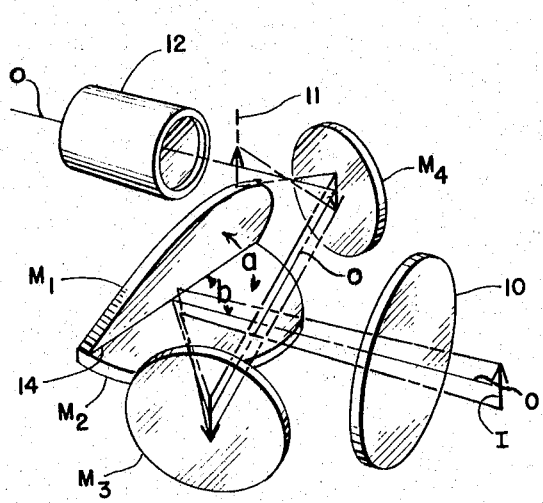
FIGURE 1 is a diagrammatic view of a preferred form and arrangement of an optical erecting system, in accordance with the present invention and showing the relation between the erecting system of mirrors and a conventional objective lens and eyepiece.

In accordance with the present invention and by reference to FIGURE 1 of the drawing, four plane mirror surfaces having first surfaces of reflection are shown comprising the optical erecting system of the present invention, two mirrors being in the form of a roof-mirror pair $M_1$—$M_2$ located relatively near the entrance pupil or image thereof and as herein defined by objective lens 10, and away from the image or focal plane indicated at 11. Essentially, the roof-mirror pair is so positioned in relation to the objective 10 and an eyepiece 12, or exit pupil, as to receive the image from the objective and reflect it successively through spaced mirrors $M_3$ and $M_4$ in order to bring about complete erection of the image at the focal plane 11. The roof-mirror pair $M_1$—$M_2$ thus bears a particular relation to the objective, spaced mirrors $M_3$ and $M_4$ and the focal plane and in which all plane mirror members are to be made independently adjustable in a manner to be described.

Placement of the roof-mirror pair away from the image plane has been found to avoid the development of shadows in the image field from the gap formed at the ridge or line of intersection 14 between mirrors $M_1$ and $M_2$ of the roof, or at least to appreciably reduce the tolerance requirements necessary to make the shadow unnoticeable to the eye of the observer. Near the objective, the effect of the shadow produced is greatly minimized since the tolerable width of the gap can be shown to be directly proportional to the ratio of the roof distance from the image plane and the objective or entrance pupil distance from the image plane. Accordingly, the greater the distance of the roof from the image plane, the higher the ratio and greater allowable tolerance of the gap, and from this it will be seen that the manner of adjustment of the roof-mirror pairs, as well as their manufacture and mounting will as a result be made much less critical.

Referring in more detail to the preferred form represented in FIGURE 1, the roof-mirror pair $M_1$ and $M_2$ actually forms a roof having an included angle $a$ of approximately 90°, and where the line of intersection 14 between the mirror pairs is arranged horizontally and is centered in relation to the optical axis O passing through the center of the objective 10. The angle of incidence $b$ of the optical axis O with the horizontal line of intersection 14 is at some angle less than 90° in order to permit reflection of the image from the roof-mirror pair away from the objective lens. In turn, the spaced mirrors $M_3$ and $M_4$ are vertically disposed and centered in relation to the light path; also, the virtual or imaginary line of intersection between the spaced mirrors will be substantially perpendicular to the horizontal line of intersection 14 of the roof-mirror pair, the spaced mirrors $M_3$ and $M_4$ being located on opposite sides of the roof-mirror pair in somewhat angular facing relation thereto. The mirror $M_4$ is of course aligned in relation to the eyepiece 12 so that the optical axis will remain centered in relation to the eyepiece to receive the erected image from the mirror at the image plane 11, specifically in order to restore the direction of the light path or bundle so that it will enter the eyepiece parallel, or substantially so, to the light path through the objective. In the relation described, a number of advantages are derived including the fact that one is able not only to control folding of the light path into a very small volume, but also the light path can be regulated and adjusted for folding over a wide range depending upon requirements of the mirror system for given applications. In this connection, the light path has an optical axis which remains in a common horizontal plane and which in the plane mirror system has been found to considerably reduce distortion, especially that of "falling" lines.

Considering in more detail the passage of an image I through the mirror system of the present invention, of course the objective will cause complete inversion and reversion of the image so that, assuming there is no mirror system, the image would appear in completely inverted form at the focal or image plane 11. The mirror system of the present invention erects the image, by subjecting it to inversion as it is reflected through the roof-mirror pair, then reversing it as it is reflected between the two spaced mirrors $M_3$ and $M_4$. Accordingly, as seen from spaced mirrors $M_3$ and $M_4$, upon reflection from the roof-mirror pair, the image would be inverted to appear as shown on the surface of $M_3$. However, upon reflection of the image between $M_3$ and $M_4$ it will undergo reversal, left to right, so that from the eyepiece theoretically it would appear as indicated on the surface of $M_4$. Complete inversion and reversal as is caused by the objective lens, however, will actually cause the image to appear in erected form at the image plane.

Figure 2:
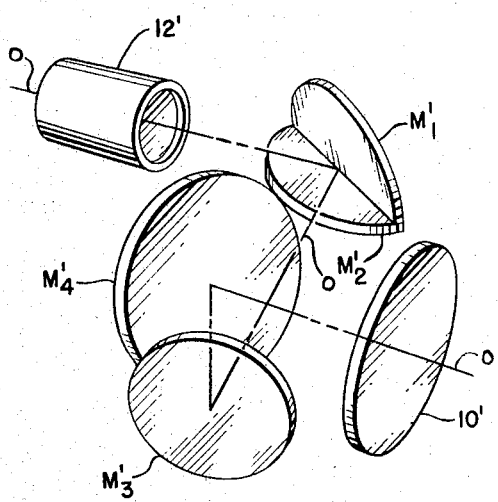
FIGURE 2 is a diagrammatic view of a modified form of erecting system, in accordance with the present invention, and again illustrating the relationship between the mirror system and an objective lens and eyepiece.

In the modified form of FIGURE 2, the relative disposition of the spaced mirrors and roof-mirror pair is essentially reversed so that the roof-mirror pair $M'_1$–$M'_2$ is located between the spaced mirrors $M'_3$ and $M'_4$ and the focal plane. Specifically, $M'_4$ is centered to receive the image from the objective and to reflect it successively to $M'_3$ and $M'_1$–$M'_2$ then to the ocular 12' whereby the image will first undergo reversal between the spaced mirrors $M'_4$ and $M'_3$ then inversion as it is reflected by the roof-mirror pair, followed by reinversion at the focal plane as described in the preferred form. In either form, the minimum distance of the roof-mirror pair from the focal plane will be determined in each mirror system by establishing the location at which the ridge or shadow due to the gap formed by the roof line of intersection will just disappear at the focal plane; i.e., the shadow will be weak enough so that it would no longer disturb the appearance of the image at the focal plane. Of course, depending upon the permissible distance, the tolerance requirements of the roof will become more critical as the ratio of the distance of the roof to the focal plane and of the objective to the focal plane is reduced.

Again, the direction of the roof line of intersection is most desirably perpendicular, or substantially, so to the intersecting line of the spaced mirrors $M'_3$ and $M'_4$ so as to avoid tilting of the image. In this connection, necessary adjustments to be made in the mirror system to avoid tilting of the image will be discussed in more detail hereinafter. Further in this connection, the location of the focal plane in relation to the mirror system is of course determined by the curvature of the objective lens. Most desirably, this location is established at some point between the last reflective surface and the ocular so as to appear as represented in FIGURES 1 and 2 and accordingly, once the mirror system is properly arranged for folding of the light path in the desired manner, the objective lens employed will have the necessary curvature to position the focal plane at some intermediate point in front of the ocular. As another possible modification, the focal plane may be located ahead of the first reflective surface so that the image is completely inverted before it is reversed through the succession of reflections in the mirror system. Of course, this would require a corresponding correction in the relative disposition of the mirrors and particularly insofar as the permissible tolerance and disposition of the roof-mirror in relation to the focal plane is concerned.

In either form of system it will be noted that the light bundle passing through the objective undergoes a series of reflections for complete erection of the image at the focal plane that furthermore in either form of system the ridge or line of intersection of the mirrors comprising the roof-mirror pair will effectively intersect the light bundle and divide it into two halves since the line of intersection is located at the optical axis. In this relation, the relative disposition and arrangement of the plane mirrors in either form of system permit easy and accurate adjustment of the mirrors both for the purpose of focusing and maintaining the necessary tolerances, particularly in the roof-mirror arrangement. With respect to the latter, the roof-mirror pair must meet certain tolerance requirements in order to provide for the erection of an image in clear, undistorted form and in accordance with the present invention and due to the particular disposition of the roof mirror, it is possible to meet these tolerance requirements through suitable provision for adjustment of the roof mirror.

The manner and means of adjustment will now be considered in more detail, with specific reference to the installation of the minor system in an optical instrument. As explained, the tolerable width of the roof is that width of the gap formed at the intersection of the mirrors $M'_1$ and $M'_2$ which would remain unnoticed in the image and this tolerance becomes greater the closer the roof is to the entrance pupil or objective of the lens system. In addition, to avoid formation of double images the permissible deviation of the roof angle $a$ from 90° will depend on the angle of incidence $b$ from the optical axis on the line of intersection of the roof-mirror pairs, as well as the location of the roof in relation to the image field. This relationship, at least insofar as it relates to roof mirrors, is known and for a more detailed discussion of this relation as well as the derivation of the formula for determination of roof angle tolerances, reference is herein made to an article by the applicant of this invention entitled "Tolerance for Roof Prisms" in the Journal of the Optical Society of America, volume 49, No. 8, page 830 and dated August, 1959 as well as other articles referred to therein. In any event, a number of independent adustments are made necessary during assembly in order to properly regulate the roof-mirror surfaces not only in relation to one another but also to the entire mirror system so as to come within the required tolerances in each given application for production of a clear, undistorted image.

In actual practice and taking for example a field glass employing a roof-mirror system of the present invention, a maximum of four manipulations are necessary for proper adjustment of the entire system in order to bring about complete image erection without distortion. A preferred manner of adjustment is shown in FIGURES 3–8 illustrating the use of the mirror system of the present invention in a binocular 20, which is of course nothing more than the utilization of two field glasses in one instrument. Broadly, the binocular comprises a pair of casings 22 connected in conventional, hinged-together relation as at 27. Each casing preferably is formed of upper and lower halves 24 and 25 defining a relatively large tubular portion 28 to enclose the objective 10, a central housing 29 for the mirror system and a relatively small, rearwardly directed tubular portion 30 to house the ocular 12. Actually, the tubular portions 28 and 30 form with the housing 29 an enlarged cavity to permit continuous passage of the image therethrough in order to undergo a number of successive reflections, as described, by the mirror system and whereby the light path will enter the ocular 12 parallel to the light path through the objective 10. In hinged-together relation, it will be seen that the interpupillary distance between the oculars 12 will be relatively near in relation to the spacing between the objectives and further in this relation, it will be observed that the erection of each image by the mirror system will take place in a single horizontal plane common to both systems. This arrangement has a number of advantages, notably the fact that stereoscopic or space perception is greatly enhanced due to the relatively wide spacing of the objectives in relation to the oculars, and the manner in which the light path is folded in a common horizontal plane further reduces distortion and permits construction of a very compact binocular.

Figure 4:
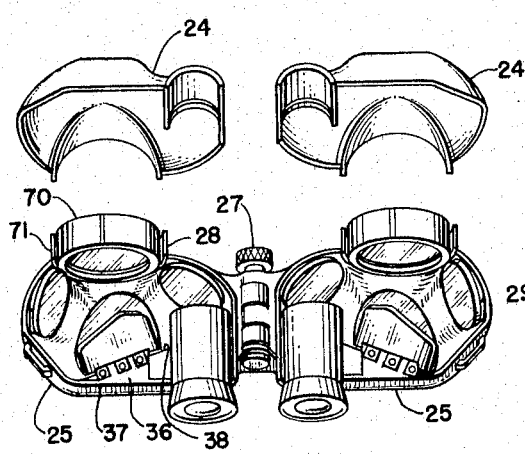
FIGURE 4 is an exploded, somewhat perspective view of the interior of the binocular showing the arrangement of the erecting mirror system therein.

Referring in more detail to FIGURES 4–6, the upper and lower halves 24 and 25 are normally assembled in sealed together relation and together form vertical slides 32 and relatively flat top and bottom surfaces 33 and 34 which converge at the area of connection with the hinge. Various suitable fastening or clamping means may be employed whereby the upper half 24 may be removed periodically for adustment and servicing of the mirror system as required, and as shown in FIGURE 4. The vertical sides permit disposition of the mirrors $M_3$ and $M_4$ in upstanding relation adjacent to diametrically opposite ends of the tubular portion 28, and a flat stool 36 is formed within the casing along the rearward side of the lower half of the casing opposite the objective. The stool 36 has a front supporting surface 38 which inclines forwardly toward the tubular portion 32 and which surface will largely govern the angle of disposition of the mirror pair $M_1$ and $M_2$ in relation to the objective.

Each mirror $M_3$ and $M_4$ is made adjustable through a limited angle and wherein the direction of adjustment for the two mirrors is approximately perpendicular to one another, as a result of which it is possible to eliminate special means of adjustment for the objective which would otherwise be cumbersome and expensive. For this purpose, and as best seen from a consideration of FIGURES 5 and 6, the mirror $M_3$ is in the form of a first surface of reflection of circular shape having applied to its rear surface a metal supporting plate 40 with a spring-arm 41 extending rearwardly from the central portion of the plate. Spring-arm 41 has an opening thereon for alignment with a correspondingly sized opening in a mounting bracket 42 projecting inwardly from the casing and for reception of a screw 44 to mount the spring-arm and connected mirror arrangement stationarily in relation to the bracket. Flanking either side of the bracket 42 are bosses 45 and 46, the boss 45 having a threaded opening therein for reception of an Allen screw 48 and the boss 46 being recessed to a limited extent to provide for seated disposition of a spring 49. Both the screw 48 and spring 49 are dimensioned so as to normally project outwardly from their respective bosses into abutting relation with the back surface of the supporting plate 40. Although not shown, the threaded opening for the boss can be made accessible from the exterior of the casing to permit threaded adjustment of the screw which will cause a bending moment to be applied about the spring-arm 41 and corresponding angular displacement of the mirror $M_3$ essentially about a horizontal axis in the plane of the optical axis or center line of the entire mirror system. Similarly, mirror $M_4$ is provided with parts identical to those used with mirror $M_3$ and which are identified by corresponding numerals, but which elements are positioned at 90° to the over-all arrangement of parts for the mirror $M_3$ so as to permit corresponding adjustment of the mirror $M_4$ but essentially about a vertical axis perpendicular to the optical axis of the system. To adjust each mirror, specifically outward threading of either screw 48 will cause bending of the spring arm against the pressure of the spring 49; inward adjustment of the screw away from the supporting plate 48 will permit the mirror to swing toward the screw under the urging of the spring 49.

The roof-mirror pair is also made adjustable into proper relation with the spaced mirrors and the objective lens, principally to avoid the necessity of close tolerances in manufacturing. The particular means of adjustment may assume various forms essentially to correct, when necessary, the roof angle and the tilting angle. As a secondary consideration, provision can also be made for varying the angle of incidence $b$ and over-all tilting of the roof-mirror with respect to the optical plane. In the form illustrated, the lower mirror $M_2$ is semicircular in shape and has applied thereto a special back supporting plate 52 with an outwardly extending flange 53 formed at an angle greater than 45° to the plate 52. The plate 52 serves as a means of permanent support for the entire roof mirror by interconnection with a pair of spaced brackets 54 projecting forwardly from the mirror stool 36. Brackets 54 each include elongate slots 55, shown dotted in FIGURE 8, and the flange 53 includes a pair of openings for alignment with the slots and for receipt of a pair of connecting screws 56 to hold the entire supporting plate and mirror $M_2$ in connected relation to the stool 36. In addition, spring element 57 is positioned between brackets 54 and flange 53 just behind each connecting screw 56.

Mirror $M_1$ is illustrated as being of elliptical configuration and, in turn, is mounted on a back supporting plate 58 having a series of spaced outwardly projecting flanges 59 bent at an angle to the plate 58 and at a slight angle to the flange portion 53 when the mirror $M_1$ is mounted at a roof angle of approximately 90° to the mirror $M_2$. As shown, a series of three flanges 59 are provided, there being one at each terminal end of the mirror $M_1$ and an intermediate flange being centered in relation to the mirror, each flange having an opening corresponding with openings provided in the flange 53 for reception of connecting screws 60.

To adjust the roof angle to be at 90° within permissible limits, inward threading of the screws 60 will force the mirror $M_1$ outwardly in relation to mirror $M_2$ so as to increase the angle therebetween; outward threading of the screws 60 will of course decrease the angle. On the other hand, the titlting angle, which is that angle formed between the ridge line 14 and the perpendicular line of intersection of the mirrors $M_3$ and $M_4$, is controlled independently of the roof angle. This angle must very closely approximate 90°, to avoid falling lines, and essentially involves rotation of the ridge line 14 in a vertical plane, or in other words, rotation about a horizontal axis passed perpendicularly through the center point of the ridge line 14. In the illustrated form, this adjustment is easily made by threading one screw 56 inwardly or outwardly, as required, in relation to the other so as to effectively raise or lower one side of the line 14 relative to the other. Similarly, this adjustment can be effected by making the mirror stool 36 adjustable, or free to be rotated about a horizontal axis passing perpendicularly through the roof line. As a further alternative, mirror $M_1$ may be shifted or moved along mirror $M_2$ to modify the direction of the roof line.

The screws 56 also define an additional means of adjustment for the angle of incidence as well as for alignment of the roof line with the optical axis. The springs 57 will constantly urge the flanges 53 against the heads of screws 56; whatever slight adjustment is necessary to vary the angle of incidence can be made by shifting the slotted flanges 53, either forwardly or rearwardly, about the screws 56. The roof line 14 can be displaced vertically into proper alignment with the optical axis, if necessary, by inward and outward threading of the screws 56 a corresponding distance, and the springs 57 will force the flanges to follow the outward movement of the screws. In actual practice, the latter adjustments would be made in conjunction with the tilting angle adjustment.

It should be kept in mind that all necessary adjustments to be made upon assembly will be within very close tolerances requiring limited movement of the various parts. Accordingly, such changes will have little effect, if any, on the width of the gap at the roof line.

In assembling the mirror system, all mirrors are mounted as described, along with the objective and eyepiece. For close, accurate adjustment, the mirrors $M_3$ and $M_4$ are first regulated to eliminate horizontal and vertical displacement in the system. This will insure that the optical axis is in a common plane and properly direct the light bundle into the eyepiece in a path parallel to its entry path through the objective. The roof mirror is then adjusted as described primarily to set the roof angle and tilting angle so as to avoid formation of double image and tilt (falling lines) in the image field. Again, it will be evident that the particular means devised for adjustment of the roof-mirror and spaced mirrors can be modified according to the particular requirements and space limitations in each given application.

The modified mirror system shown in FIGURE 2 may similarly be incorporated into an optical instrument in the manner described for instance with reference to that of FIGURE 1, bearing in mind the purpose and relationship of the different adjustments during assembly. In an instrument, once properly assembled and adjusted, the upper half 24 is sealed or otherwise tightly secured to the lower half 25 of the casing, and any access openings also should be sealed to prevent tampering with the system, although the casing should be made removable by qualified personnel.

By provision only for the adjustments as described, it is also possible to eliminate expensive, somewhat complicated adjusting means for the objective lens 10, field lens 69, and ocular 12. Accordingly, the objective 10 can be mounted in a lens tube 70 having an external rim 71 secured to the tubular portion 28; the field lens 69 and the ocular 12 are similarly mounted within a common tube 72 and fastened within the tubular portion 30. It is understood that the objective and eyepiece arrangement as broadly described is merely representative of any conventional arrangement in a telescope for magnifying images, and various conventional means of adjustment may be employed for focusing the field lens and ocular as desired.

Another consideration of secondary importance is to prevent entry of stray light into the mirror system, as well as to protect the objective lens.

Figure 3:
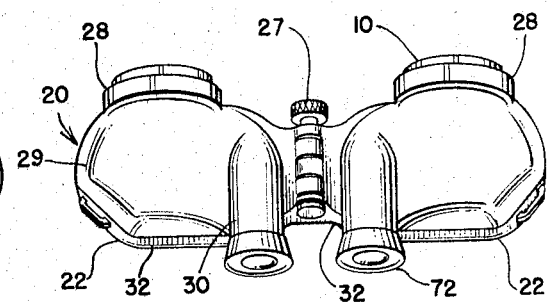
FIGURE 3 is a perspective view of a binocular incorporating the preferred form of mirror system as shown in FIGURE 1.

As best seen from FIGURES 3, 4 and 7, this is accomplished by mounting a tubular shield 74 in concentric relation between the lens tube 70 and tubular portion 28. Also, a lid 76 is mounted in hinged relation at one side of the outer edge of the tubular portion to cover both the shield and the objective lens. To enable movement of the shield relative to the lens tube, their adjacent surfaces may be threaded or connected through a suitable bayonet slot arrangement so as to permit slidable movement of the shield along the lens tube. Thus, as the shield slides outwardly in relation to the tube it will automatically force the lid into the position shown dotted in FIGURE 7 so as to provide a free view through the field glass while protecting against stray light, and without increasing the volume or appreciably adding to the weight of the field glass. Of course, when pushed back the lid will protect the lens against damage or entry of foreign particles.

It will be seen from the foregoing that the mirror system of the present invention provides for a simplified, yet highly effective means of completely erecting an image and due to its size and small volume requirements is highly conformable for use in various applications such as of the type described. In practical use, manufacturing requirements are lessened to a high degree through the unique means of adjustment devised. In making a binocular from two single field glass bodies, the bodies can be connected in hinged-together relation as described or various other suitable connecting means may be employed for example in such a way that the bodies are made adjustable, to conform to differences in interpupillary distances, while maintaining the separate body portions in a completely horizontal plane.

The angle of incidence of the optical axis at the roof line may be varied over a wide angle and broadly can be established at any angle less than 90° which will enable complete reflection of the image without physical interruption of the light path by the spaced mirrors or objective lens. Of course, the angle selected will be governed largely by the manner of folding the light path and this will in turn dictate the spacing and distance between mirrors. Moreover, the size of the roof-mirror pair necessary for complete reflection will depend on this angle, and as a general statement this size may be reduced as the angle of incidence approaches 90°. In the system, additional mirror combinations may be used in combination therewith again depending upon the requirements in each given application, but at least four plane mirror surfaces are necessary in accordance with the present invention to bring about complete erection of an image.

Furthermore, the present invention would have corresponding application to any type of optical instrument where an image erecting system is required, for instance, microscopes. In such other cases, it might be required that the incident and emitted directions of the optical axis are not parallel but would vary by some finite angle with each other. This can easily be compensated for by changing the angles between intersection line 14 and mirrors $M_3$ and $M_4$, as well as their mutual disposition.

Another advantage of my image erecting system is that it is possible to use mirrors made of light metals instead of glass. This further decreases weight, decreases danger of breakage, and greatly fascilitates mounting of the mirrors into the assembly; bosses, brackets, and threads can immediately be worked onto or into the mirrors. The nature and composition of the light metal mirrors used does not form a part of this invention; however, a method developed for optical instruments for space efforts can advantageously be used for this purpose. It consists of a body of aluminum magnesium or beryllium alloys coated with a polishable layer of, for instance, a nickel-phosphorus alloy, sold under the trademark "Kanigen" by Keystone Chromium Corporation, and which is then polished by conventional optical methods and yields an optical surface of highest quality. This surface is in turn coated with a high reflecting coat of for instance aluminum and silicon oxide by well known processes.

It is therefore to be understood that various other changes and modifications may be made in the present invention, such as the composition of the mirrors and the specific manner and means employed for adjustment, without departing from the scope of the present invention as defined by the appended claims.

What is claimed is:

1. In an optical instrument having an objective lens and an ocular lens arranged in spaced parallel relationship, the combination therewith of an optical image-erecting system between said objective and said ocular including four plane mirrors each having a first surface of reflection, a pair of said mirrors defining a roof-mirror, a roof-mirror support for said roof-mirror including adjusting means to control the tilting angle of the roof line of intersection by rotating said roof-mirror in a vertical plane passing through said roof line of intersection, said rotation taking place about an axis perpendicular to said vertical plane and passing close to the center point of said roof line of intersection, a roof-angle adjusting means to regulate the roof angle between said pair of mirrors of said roof-mirror, the remaining ones of said four plane mirrors being positioned in spaced relationship to one another and to said roof-mirror, said roof-mirror being positioned in the optical path between said objective lens and said remaining ones of said four plane mirrors, said remaining ones of said four plane mirrors having a common axis of intersection substantially normal to said roof line of intersection, and each of said remaining ones of said four plane mirrors having adjusting means for adjusting each said mirror only in a direction perpendicular to the direction of adjustment of the other of said remaining one of said four plane mirrors.

2. In an optical instrument having a housing with an objective lens and an ocular lens arranged in spaced parallel relationship within said housing, a pair of plane mirrors having first surfaces of reflection mounted in said housing to define a roof-mirror opposite said objective lens and having a roof line of intersection substantially in the optical axis of said optical instrument, roof-mirror adjusting means to regulate the tilting angle of the roof line of intersection about an axis passing through the approximate center point of said roof line of intersection in a horizontal plane, said regulation of said tilting angle being in a plane perpendicular to said axis, adjusting means for the roof angle of said roof-mirror, a pair of spaced, substantially vertical plane mirrors having first surfaces of reflection arranged with their center lines intersecting one another at said roof line of intersection and having a vertical line of intersection perpendicular of said roof line of intersection, said spaced mirrors being further positioned in relation to said roof-mirror in the optical path between said roof mirror and said ocular lens, and independent mirror-adjusting means positioned between each said spaced mirror and said housing to provide for adjustment of said respective spaced mirrors about single respective axes which are respectively perpendicular to one another.

3. An optical instrument in accordance with claim 2, having a pair of said housing, lens, and mirror assemblies connected to form a binocular instrument.

References Cited by the Examiner

UNITED STATES PATENTS

| | | | |
|---|---|---|---|
| 674,465 | 5/1901 | Hensoldt | 88—33 |
| 880,028 | 2/1908 | Konig | 88—33 |
| 1,479,036 | 1/1924 | Fosdick | 88—72 |
| 1,775,180 | 9/1930 | Worsching | 88—1 |
| 2,058,676 | 10/1936 | Foster | 88—33 |
| 2,942,514 | 6/1960 | Brandon | 88—85 X |
| 2,969,712 | 1/1961 | Olson | 88—85 X |
| 3,030,856 | 4/1962 | Jordan | 88—15 X |
| 3,043,195 | 7/1962 | Moultrie | 88—72 X |

FOREIGN PATENTS 238,867   12/1945   Switzerland.

OTHER REFERENCES

Huber, German application 1,055,842 printed April 23, 1959.

DAVID H. RUBIN, *Primary Examiner.*